United States Patent [19]

Harper, III et al.

[11] Patent Number: 4,918,600
[45] Date of Patent: Apr. 17, 1990

[54] DYNAMIC ADDRESS MAPPING FOR CONFLICT-FREE VECTOR ACCESS

[75] Inventors: David T. Harper, III, Dallas; Darel A. Linebarger, Plano, both of Tex.

[73] Assignee: Board of Regents, University of Texas System, Austin, Tex.

[21] Appl. No.: 226,721

[22] Filed: Aug. 1, 1988

[51] Int. Cl.$^4$ .......................................... G06F 12/06
[52] U.S. Cl. .................................. 364/200; 364/242; 364/243.1; 364/246; 364/246.3; 364/254; 364/254.4
[58] Field of Search ...................... 364/200, 300, 900

[56] References Cited

U.S. PATENT DOCUMENTS

| | | | |
|---|---|---|---|
| 4,370,732 | 1/1983 | Kogge | 364/900 |
| 4,400,768 | 8/1983 | Tomlinson | 364/200 |
| 4,435,765 | 3/1984 | Uchida et al. | 364/200 |
| 4,731,724 | 3/1988 | Michel et al. | 364/200 |

OTHER PUBLICATIONS

Paul Budnik and David J. Kuck, "The Organization and Use of Parallel Memories," *IEEE Transactions on Computers*, C-20(12), pp. 1566–1569, (Dec. 1971).
R. C. Swanson, "Interconnections for Parallel Memories to Unscramble p-Ordered Vectors," *IEEE Transactions on Computers*, C-23, pp. 1105–1115, (Nov. 1974).
Duncan H. Lawrie, "Access and Alignment of Data in an Array Processor," *IEEE Transactions on Computers*, C-24(12), pp. 1145–1155, (Dec. 1975).
K. E. Batcher, "The Multidimensional Access Memory in STARAN," *IEEE Transactions on Computers*, C-26, pp. 174–177, (Feb. 1977).
Duncan H. Lawrie and Chandra R. Vora, "The Prime Memory System for Array Access," *IEEE Transactions on Computers*, C-31(5), pp. 435–442, (May 1982).
J. M. Frailong, W. Jalby, and J. Lenfant, "XOR-Schemes: A Flexible Data Organization in Parallel Memories," *1985 International Conference on Parallel Processing*, pp. 276–283, (1985).
Abhiram G. Ranade, "Interconnection Networks and Parallel Memory Organizations for Array Processing," *Proceedings of the 1985 International Conference on Parallel Processing*, pp. 41–47, (Aug. 1985).
Wilfried Oed and Otto Lange, "On the Effective Bandwidth of Interleaved Memories in Vector Processing Systems," *IEEE Transactions on Computers*, C-34(10), pp. 949–957, (Oct. 1985).
D. T. Harper, III and J. R. Jump, "Vector Access Performance in Parallel Memories Using a Skewed Storage Scheme," *IEEE Transactions on Computers*, C-36(12), pp. 1440–1449, (Dec. 1987).
Alan Norton and Evelyn Melton, "A Class of Boolean Linear Transformations for Conflict-Free Power-of-Two Stride Access," *Proceedings of the 1987 International Conference on Parallel Processing*, pp. 247–254, (1987).

*Primary Examiner*—Raulfe B. Zache
*Attorney, Agent, or Firm*—Arnold, White & Durkee

[57] ABSTRACT

Conflict-free vector access of any constant stride is made by preselecting a storage scheme for each vector based on the accessing patterns to be used with that vector. A respective storage scheme for each vector, for example, is selected to provide conflict-free access for a predetermined stride S. The respective storage scheme involves a rotation or permutation of an addressed row of corresponding memory locations in N parallel modules in main memory. The amount of rotation or permutation is a predetermined function of the predetermined stride S and the row address. The rotation is performed by modulo-N addition, or the permutation is performed by a set of exclusive-OR gates. For a system in which N is a power of 2 such that $n = \log_2 N$, the predetermined stride S is factored into an odd component and an even component that is a power of 2. The factorization is easily performed by a shift and count procedure, a shifter and counter, or a priority encoder. The amount of rotation or permutation is a predetermined function of the even component and the row address, and is preferably obtained by selecting a field of the row address in accordance with the maximum of s and n, and masking the selected field with a mask generated from the minimum of s and n.

20 Claims, 6 Drawing Sheets

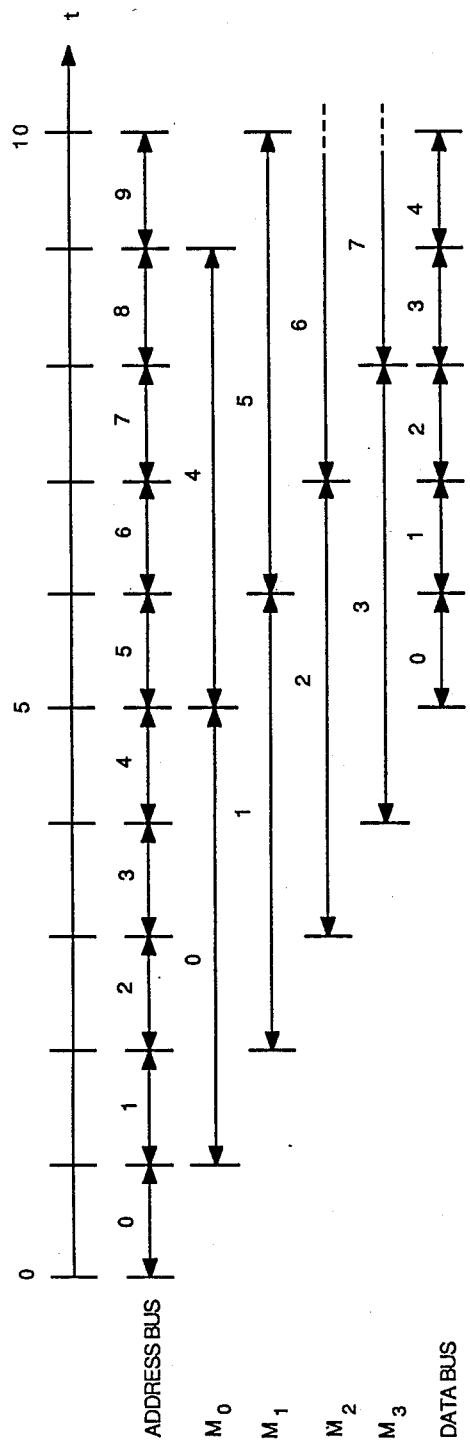

FIG. 5 N=8, S=4 DYNAMIC STORAGE (ROTATIONAL)

| $M_0$ | $M_1$ | $M_2$ | $M_3$ | $M_4$ | $M_5$ | $M_6$ | $M_7$ |
|---|---|---|---|---|---|---|---|
| 0 | 1 | 2 | 3 | 4 | 5 | 6 | 7 |
| 15 | 8 | 9 | 10 | 11 | 12 | 13 | 14 |
| 22 | 23 | 16 | 17 | 18 | 19 | 20 | 21 |
| 29 | 30 | 31 | 24 | 25 | 26 | 27 | 28 |
| 32 | 33 | 34 | 35 | 36 | 37 | 38 | 39 |
| 47 | 40 | 41 | 42 | 43 | 44 | 45 | 46 |
| 54 | 55 | 48 | 49 | 50 | 51 | 52 | 53 |

FIG. 6 N=4, S=8 DYNAMIC STORAGE (ROTATIONAL)

| $M_0$ | $M_1$ | $M_2$ | $M_3$ |
|---|---|---|---|
| 0 | 1 | 2 | 3 |
| 4 | 5 | 6 | 7 |
| 11 | 8 | 9 | 10 |
| 15 | 12 | 13 | 14 |
| 18 | 19 | 16 | 17 |
| 22 | 23 | 20 | 21 |
| 25 | 26 | 27 | 24 |
| 29 | 30 | 31 | 28 |
| 32 | 33 | 34 | 35 |

FIG. 7 N=4, S=8 DYNAMIC STORAGE (EXCLUSIVE-OR)

| $M_0$ | $M_1$ | $M_2$ | $M_3$ |
|---|---|---|---|
| 0 | 1 | 2 | 3 |
| 4 | 5 | 6 | 7 |
| 9 | 8 | 11 | 10 |
| 13 | 12 | 15 | 14 |
| 18 | 19 | 16 | 17 |
| 22 | 23 | 20 | 21 |
| 27 | 26 | 25 | 24 |
| 31 | 30 | 29 | 28 |
| 32 | 33 | 34 | 35 |

| S | s |
|---|---|
| X...XXX 1 | 0...000 |
| X...XXX10 | 0...001 |
| X...XX100 | 0...010 |
| X...X1000 | 0...011 |
| X...10000 | 0...100 |
FIG. 8
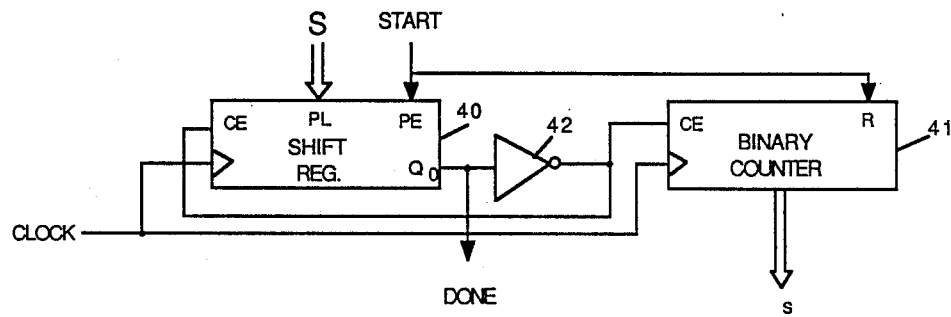
FIG. 9
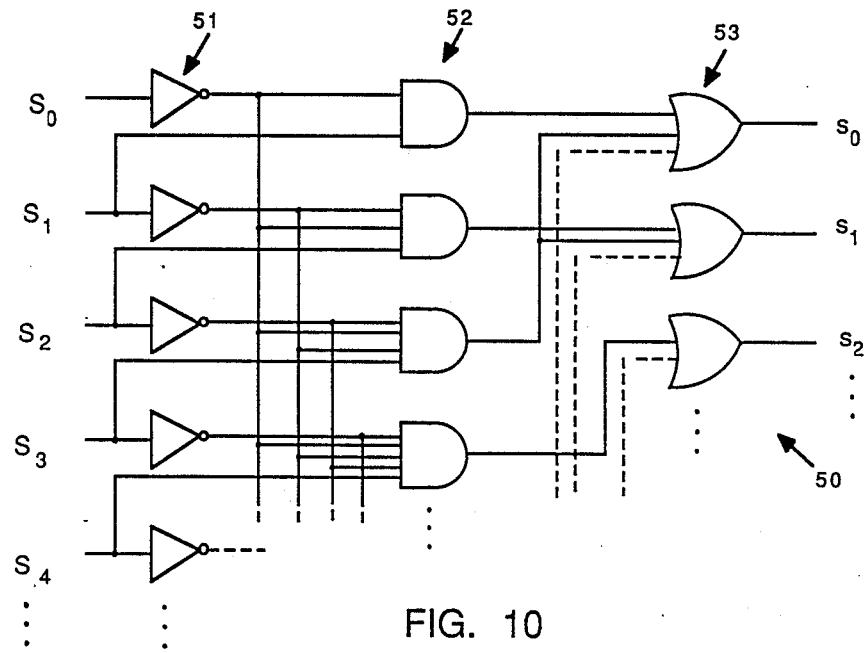
FIG. 10

| min (n,s) | mask 0:n-1 |
|---|---|
| 0 | 0...0001 |
| 1 | 0...0001 |
| 2 | 0...0011 |
| 3 | 0...0111 |
| n | 1...1111 |

DYNAMIC ADDRESS MAPPING FOR CONFLICT-FREE VECTOR ACCESS

BACKGROUND OF THE INVENTION

1. Field of the Invention.

This invention relates generally to computer architecture and more particularly to computers having multiple memory modules which are accessed in parallel to store and retrieve elements of a common data structure. The invention specifically relates to a dynamic storage scheme for such a computer.

2. Description of the Related Art.

The performance of a heavily pipelined vector processor is highly dependent on the speed at which data can be transferred between the vector processor and main memory. Because processor speeds are substantially higher than memory speeds, it is necessary to use memory systems having multiple memory modules that are accessed in parallel to provide a data transfer rate that matches the processor speed.

To permit the parallel access to the memory modules, the vectors are stored in respective regions of memory address space that are allocated among the multiple memory modules. In particular, the mapping of the memory addresses referenced by the processor to the physical storage locations of the memory modules is often referred to as the "storage scheme" of the system.

For the storage scheme to be effective in providing a high data transfer rate, successive memory addresses referenced by the processor must be mapped to different ones of the memory modules. Otherwise, a memory module will be busy storing or retrieving data for a previous reference when the processor references the subsequent memory address. This undesirable condition is known generally as a "memory conflict" and more specifically as a "collision".

It is not possible to entirely eliminate memory conflict by the judicious selection of a single storage scheme unless the freedom of the vector processor to reference the memory address space is also limited. In a typical system, the vector processor references successive memory addresses that differ by an amount S known as the "stride" of the memory access. In other words, the vector processor references the successive addresses $a_o$, $a_o+S$, $a_o+2S$, $a_o+3S$, .... If the storage scheme is fixed and the processor is permitted to access the memory without limitation as to the stride, then there is always a possibility of a memory conflict occurring when the stride happens to coincide with a difference between two addresses mapped to the same memory module.

The simplest storage scheme is known as the "low-order interleaved" scheme which maps the address a into the memory module a mod N, where N is the number of memory modules in the system. In such a storage scheme, however, memory collisions will occur whenever the stride S of the memory access is divisible by N, because the successive memory references will cause only one memory module to be accessed.

The performance of a system using the "low-order interleaved" scheme is also degraded whenever the stride S and the number of memory modules N have a common factor greater than 1 (i.e., S and N are not relatively prime), because in this case some of the memory modules will not be accessed at all. In particular, if N is prime, access is conflict-free for a larger set of strides than when N is composite. The use of a prime number of modules, however, has several disadvantages, the primary one being that the address to storage location mapping becomes computationally expensive.

For any storage scheme, the average data transfer rate between the processor and main memory cannot exceed the rate of a single module multiplied by the number of modules that are actually accessed during the data transfer. Therefore, to achieve memory access at the maximum possible data transfer rate for vectors having a length well in excess of N, it is necessary for all N of the memory modules to be accessed during each memory cycle except at the beginning and end of data transfer. By definition, this condition is known as "conflict-free" memory access.

For any storage scheme, it is desirable to provide conflict-free access for a stride of 1. Access having a stride of 1 is known as "sequential access" and it is typically used to initially load vector data into the main memory. Once loaded, the data are typically accessed at a different stride in addition to a stride of 1.

Matrix operations, for example, have been performed by sequential access of main memory to store the matrix elements by row. In other words, for a pXq matrix A(i,j), the matrix has its respective elements stored at sequential memory addresses $a_{ij}=a_{oo}+q(i-1)+(j-1)$. After the memory is loaded, it can be accessed sequentially to obtain a selected row vector $A_r(i)$ having its elements at successive addresses $a_{oo}+q(i-1)$, $a_{oo}+q(i-1)+1$, $a_{oo}+q(i-1)+2$, ..., $a_{oo}+q(i-1)+(q-1)$. But it is also desirable to access memory with a stride of $S=q$ to obtain a selected column vector $A_c(j)$ having its elements at successive addresses $a_{oo}+(j-1)$, $a_{oo}+q+(j-1)$, $a_{oo}+2q+(j-1)$, ..., $a_{oo}+q(p-1)+(j-1)$.

The problem of providing a storage scheme that is conflict-free for sequential access and conflict-free most of the time for a specified stride S is the subject of Kogge U.S. Pat. No. 4,370,732. In col. 3, line 30 to col. 4, line 60, Kogge teaches that to facilitate row and column access of a pXq matrix stored in an N-way interleaved memory, the address of each element in the ith row of the matrix should be circularly shifted by s(i−1) positions, where "s" is a "skew factor". The circularly shifted rows are then stored in memory by row as before. For a pXq matrix with a skew factor s, element A(i,j) is stored at memory location:

$$a_{ij}=a_{oo}+q(i-1)+(j-1+(i-1)s) \bmod q$$

Kogge says that the value of s to pick should be such that when accessing a column, any group of N consecutive column elements fall in N different memory modules. Kogge further says that when N is a power of 2, one need pick s as 0 or 1 depending on whether q is odd or even respectively to begin with.

For the storage scheme of Kogge wherein N is a power of 2, column access having a stride of $S=q$ will be conflict-free when q is odd because in this case $s=0$ and the mapping is the same as for a low-order interleaving scheme and q is relatively prime with respect to N. (Note that since q is odd, it does not have a factor of 2, but since N is a power of 2, it has only factors of 2). For the case of N=4 and q being an even number, Kogge's storage scheme is conflict-free for q=2, q=4 and q=6, but not for q=8.

As Kogge acknowledges in col. 2, lines 56–60, his storage scheme is a "skewing scheme" based on the work of P. Budnik and D. J. Kuck as described in Budnick and Kuck, "The Organization and Use of Parallel Memories," *IEEE Transactions on Computers* C-20(12) pp. 1566–1569 (December 1971). Skewing schemes are further described in H. D. Shapiro, "Theoretical Limitations on the Efficient Use of Parallel Memories," *IEEE Transactions on Computers* C-27(5) pp. 421–428 (May 1978); H. Wijshoff and J. van Leeuwen, "The Structure of Periodic Storage Schemes for Parallel Memories," *IEEE Transactions on Computers* C-34(6) pp. 501–505 (June 1985); and H. Wijshoff and J. van Leeuwen, "On Linear Skewing Schemes and d-Ordered Vectors," *IEEE Transactions on Computers* C-36(2) pp. 233–239 (February 1987). For a system where the number of memory modules N is a power of 2, however, no single storage scheme has been found which allows conflict-free access to vectors for all strides.

SUMMARY OF THE INVENTION

The primary object of the invention is to provide a method of conflict-free access to parallel memory modules in a vector processing system.

Another object of the invention is to provide a circuit for mapping address locations to physical memory locations in parallel memory modules for conflict-free access by a vector processor.

Conflict-free vector access for any constant stride is made by preselecting a storage scheme for each vector based on the accessing patterns to be used with that vector. These accessing patterns are, for example, a stride of 1 and a predetermined stride S greater than 1 that selects the storage scheme for the vector.

By factoring the predetermined stride S into two components, one a power of 2 and the other relatively prime to 2, a storage scheme is synthesized which allows conflict-free access to the vector using the predetermined stride. The factorization is easily performed by a shift and count procedure, a shifter and counter, or a priority encoder.

Each storage scheme involves a selected rotation or permutation of a row of corresponding memory locations in different parallel modules in main memory. The amount of rotation or permutation for any given row is a predetermined function of the power of two component of the stride and is obtained by using the power of two component to select the amount of rotation or permutation from a field of the memory address.

Assuming that the number of memory modules N is a power of 2, the selection of the field takes into consideration one of two cases, which depend upon the number (s) of factors of 2 in the stride S. In the first case, s is less than $n = \log_2 N$, and in the second case, s is greater or equal to n. For the first case, the amount of rotation or permutation (w) is found in the address field $a_{n:n+s-1}$. In the second case, w is found in the address field $a_{s:s+n-1}$.

Preferably the field selection is performed by the same circuit for both cases. The preferred field selector circuit includes a cross-bar shifter controlled by the maximum of s and n, and a mask generator controlled by the minimum of s and n for generating a mask enabling respective single-bit outputs of the cross-bar shifter to obtain the amount of rotation or permutation w.

The module address is obtained by an n-bit adder performing a modulo-N addition of w to the module address field $a_{0:n-1}$. The n-bit adder performs a rotation of the addressed row of corresponding memory locations in the memory modules. Alternatively, the module address is obtained by a set of n 2-input exclusive-OR gates combining w with the address field $a_{0:n-1}$. The exclusive-OR gates perform permutations that are orthogonal in the sense that for different values of w, none of the permutations have any of the same addresses mapped to any of the same modules.

The exclusive-OR method results in a faster address mapping since the n-bit adder has an additional delay due to carry propagation through the adder. The exclusive-OR method results in "scrambled" addresses, but any undesirable effects of the scrambling are easily eliminated by address buffers which should be used in any event to enhance the performance of the memory when accessed for strides other than the preselected stride S used to specify the storage scheme.

BRIEF DESCRIPTION OF THE DRAWINGS

Other objects and advantages of the invention will become apparent upon reading the following detailed description and upon reference to the drawings in which:

FIG. 2 is a timing diagram illustrating successive accesses of memory modules in main memory of the vector processing system of FIG. 1;

FIG. 3 is a diagram illustrating a low-order interleaved storage scheme for a main memory having four memory modules;

FIG. 4 is a diagram showing a skewed storage scheme for a main memory having four memory modules;

FIG. 5 is a diagram illustrating the preferred dynamic storage scheme of the present invention using a rotational technique and for the case of eight memory modules and a predetermined stride of four;

FIG. 6 is a diagram showing the dynamic storage scheme of the present invention using the rotational method for a main memory having four memory modules and a predetermined stride of eight;

FIG. 7 is a diagram depicting the dynamic storage scheme of the present invention for four memory modules and a stride of eight as in FIG. 6, but using an alternative exclusive-OR method;

FIG. 8 is a truth table illustrating how the number s of factors of 2 in the preselected stride is determined;

FIG. 9 is a circuit including a shift register and a binary counter for obtaining the number s from the preselected stride;

FIG. 10 is a priority encoder circuit for determining the number s from the predetermined stride;

Figure 1:
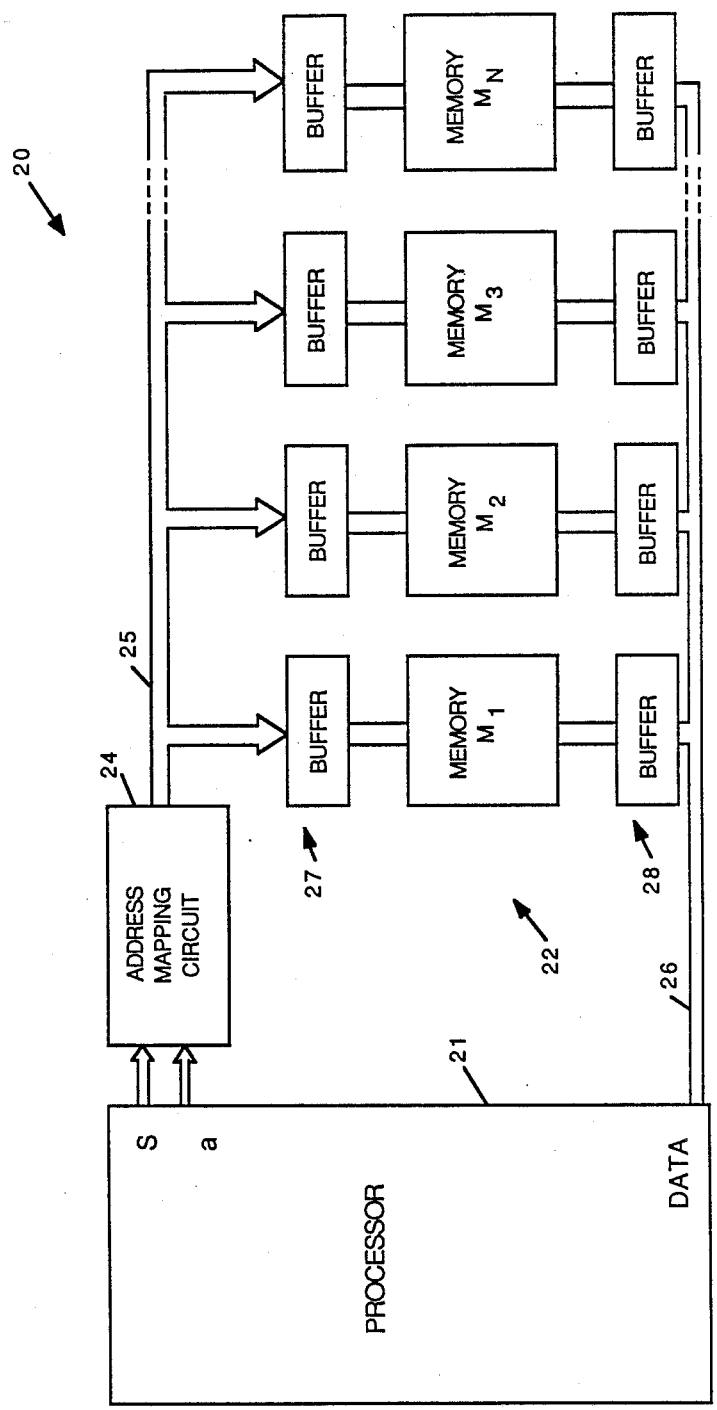
FIG. 1 is a block diagram of a vector processing system incorporating the present invention.

While the invention is susceptible to various modifications and alternative forms, specific embodiments thereof have been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, there is shown in FIG. 1 a block diagram of a vector processing system generally designated 20 which incorporates various aspects of the present invention. The vector processing system 20 includes a processor 21 that is pipelined for rapidly performing repetitive operations on successive data elements. The successive data elements are read from and written into a main memory generally designated 22 which is comprised of a set of N memory modules, $M_1$, $M_2$, $M_3$, ... $M_N$.

Because the speed of the processor 21 is substantially higher than the speed of each of the memory modules, it is necessary for the processor 21 to access the memory modules in parallel to provide a data transfer rate that matches the processor speed. Also, the storage locations in each of the memory modules is not referenced by a contiguous set of addresses, but instead the memory addresses associated with the respective memory modules are interleaved together so that sequential memory addresses referenced by the processor 21 cause different successive memory modules to be accessed. The particular mapping of the memory addresses referenced by the processor to the physical storage locations of the memory modules is known as the "storage scheme" of the system.

For the system shown in FIG. 1, the mapping is provided by an address mapping circuit 24 that dynamically changes the mapping based upon a predetermined stride S for each vector having been stored in the memory 22. This predetermined stride S is constant for so long as its associated vector remains stored in the memory 22. The vector processor, however, can access the vector with a stride that is different from the predetermined stride S. In other words, as used hereafter, the "predetermined stride S" will refer to the stride upon which the storage scheme is based, which is not necessarily the stride that the processor uses to access the vector in the main memory 22. But the address mapping circuit 24 ensures that when the processor 21 accesses a vector using the predetermined stride S for the vector, then the data transfer between the processor and the main memory 22 will occur at a maximum rate equal to the access rate of each memory module multiplied by the number N of memory modules in the main memory. The address mapping circuit also ensures that the processor can access the main memory sequentially at the maximum rate (assuming that address buffers 27 and data buffers 28 are used).

In order to reduce the number of connections between the processor and each of the memory modules, the processor is connected to the main memory 22 by an address bus 25 and a data bus 26 that are shared among the memory modules $M_1$ to $M_N$. In order to more effectively share the busses 25, 26, the address ports of the memory modules are provided with respective address buffers generally designated 27, and the data ports of the memory modules are provided with respective data buffers 28. To reduce the possibility of memory conflict, the address buffers 27 preferably can receive and hold a memory address that is different from the memory address currently referencing its respective memory module. The advantages of such an address buffer are more fully described below.

Turning now to FIG. 2 there is shown a timing diagram illustrating operations which occur when the processor 21 references sequential addresses allocated to the main memory unit 22.

Addresses are presented to the main memory 22 sequentially on the address bus 25. If the referenced module is not busy (i.e., its respective address buffer is not full), then the address is latched in its respective address buffer 27 and the address bus is available for subsequent address transfers. Data read from the module are transferred from the respective data buffer 28 and transferred to the processor 21 over the data bus 26. Data are guaranteed to return to the processor in the order requested by tagging addresses as they cross the address bus and then ordering access to the data bus based on these tags. This preferred technique is simple and avoids the need for centralized bus control.

In FIG. 2, the time t is normalized to the bus transfer time and it is assumed that the memory cycle time is equal to N times the bus transfer time. If the elements of the vector are distributed optimally over the modules, then the cycle time of each module is overlapped with address transfers to the other modules, as shown in FIG. 2, and the main memory 22 as a whole operates with an effective cycle time equal to the bus transfer time.

In FIG. 2, it is assumed that the main memory has four modules and the vector access has a stride of one. The memory modules are accessed in sequential order without contention and therefore in this case the buffers are not needed. This corresponds to the simplest storage scheme known as the "low-order interleaved" scheme shown in FIG. 3. In this scheme, the address a is mapped into the memory module a mod N.

As shown in FIG. 3, the memory is viewed as a two dimensional matrix consisting of "rows" and "modules." The term "module address" refers to the module number into which the address is mapped, and the term "row address" refers to the position of the storage location relative to the beginning of the module. In FIG. 3, for example, the row address of element nine is 2 (addressing begins at zero) and the module address of element nine is 1.

The low-order interleaved scheme has been successfully implemented in many high performance systems. The rationale for using such an interleaved scheme is twofold. First, a parallel memory system allows concurrent access to multiple data items by placing items which can be used in parallel in different modules. If out of any N consecutive memory accesses, exactly one reference is made to each module, then conflict-free access is said to have occurred. (The specific method of presenting the address to the module will depend, however, on the particular construction of the address bus and the address ports or address buffers for the respective memory modules.)

One of the common accessing patterns, particularly in vector operations, is sequential access, in which the first datum needed is found at address a, the next at address a+1, etc. In this case, the low-order interleaved scheme permits conflict-free access, as illustrated in FIG. 2, without the need for buffering between the memory modules and the address bus.

The second reason for using the interleaved scheme is that it involves a simple mapping of the address a to the physical storage locations in the memory modules. Parallel memory systems usually use an address composed of two fields. The first field, known as the module address, determines which module contains the physical storage location. The other field, known as the row address, determines the offset of the storage location within the module. Each of these fields must be obtained from the original address. When N is of the form $N=2^n$, for some non-negative integer n, the module address field and the row address field can be obtained without performing a computation. The n low-order bits of the address form the module address field and the remaining high-order bits form the row address field.

Unfortunately, interleaved schemes do not perform as well when other than sequential accessing patterns are encountered. The interleaved scheme provides conflict-free access as long as the stride is relatively prime to N. If the stride and N are not relatively prime, "collisions" occur in the memory when a reference is mapped to a module which is busy processing (reading or writing) a previous reference. This can cause substantial degradation in the performance of the system.

A well known solution to the problem of collisions is to use a skewed storage scheme. A typical skewed storage scheme is shown in FIG. 4. In this case, the address a is mapped to module (a+int(a/N)) mod N. The comparison of the low-order interleaved scheme of FIG. 3 with the skewed scheme of FIG. 4 shows that the rows of elements in the skewed scheme have been rotated with respect to the corresponding rows in the low-order interleaved scheme. When memory is accessed with a stride that is an even number, the low-order interleaved scheme has a high probability of memory collisions. The skewed scheme is better in this respect, but collisions may still occur, for example, when the memory is accessed with a stride of 8 for the storage scheme shown in FIG. 4.

One known method for further reducing the possibility of memory conflict is to use a prime number of modules in the memory unit. The use of a prime number of modules, however, has several disadvantages, the primary one being that the address to storage location mapping becomes computationally expensive. As noted above, when the number of modules is a power of 2, the mapping is trivial, and therefore the present invention is directed to providing conflict-free vector access when the number of modules N is a power of 2.

A review of the known storage schemes indicated that for a system where the number of memory modules is a power of 2, no single scheme has been found which allows conflict-free access to vectors for all strides. Therefore, according to an important aspect of the present invention, multiple storage schemes are used within a single system. The scheme to be used with each vector is chosen dynamically, and is based on the system's perception of the vector's access patterns. In particular, the storage scheme is selected to provide conflict-free access for a predetermined stride S. The predetermined stride S could be assigned by the programmer, or preferably is chosen by a vectorizing compiler based upon the vector instructions being compiled. In general, the predetermined stride S should be the stride other than 1 that is most likely to be used when accessing the vector data.

By factoring the predetermined stride S into two components, one a power of 2 and the other relatively prime to 2, a storage scheme is synthesized which allows conflict-free access to the vector using the predetermined stride.

Let $S=\sigma 2^s$ for $(\sigma, 2)=1$; the notation $(\sigma, 2)$ represents the greatest common factor of $\sigma$ and 2. This factorization exists and is unique for all integers greater than zero. For the moment, assume that $\sigma=1$. This means that S is of the form $S=2^s$. The situation for $\sigma$ greater than 1 will be discussed below.

If $S=2^s$, it is useful to partition the set of strides into two categories; strides which have at most one access per row and strides which have fewer than one access per row (accesses do not occur in every row). The first case occurs when s is less than or equal to n. The second case occurs when s is greater than n (the sub-case of s=n can be handled in either of the first or second cases).

In the following discussion, it is assumed that an initial access is made to the first element of a vector. This element is stored in module 0. No loss of generality results from this assumption.

Considering case 1 and assuming an interleaved scheme, the sequence of module addresses is: 0, $2^s$, ... , $2^{n-s}-1 2^s$. After $2^{n-s}$ references the sequence repeats since $2^{n-s}2^s$ is congruent modulo N to 0. In the interleaved scheme the $(2^{n-s})^{th}$ access falls in module 0 of the row following the initial row. This causes a collision with the $0^{th}$ access. However, if the second row is skewed relative to the initial row then rather than referencing module 0, the $(2^{n-s})^{th}$ access references module 1. Skewing the second row relative to the first allows (2) $(2^{n-s})$ accesses to be made before a conflict occurs. Each reference in the second $2^{n-s}$ accesses goes to the module adjacent to the module of the corresponding reference in the first $2^{n-s}$ accesses. To permit N accesses to occur before a conflict occurs (the condition for conflict-free accesses), it is necessary to skew $2^s$ rows relative to each other. Therefore, a conflict-free storage scheme for any stride $S=2^s$, s less than n, can be generated by circularly rotating each row. Row r should be rotated r mod $2^s$ places relative to its state in the interleaved scheme.

FIG. 5 shows an example of a dynamic storage scheme for the first case and specifically for N=8 and S=4 using the "rotational" method.

Consider now the second case where s is greater than n. For convenience and without loss of generality, it is assumed that the initial module address is again 0. The sequence of modules referenced is: 0, $2^s$, (2) $(2^s)$, ... Since $2^s=k2^n=kN$, it is clear that all references fall in the same module and maximum performance degradation occurs. Again the technique of row rotation is used to distribute references over all of the modules so that conflict-free accesses can be made. However, the rotation pattern is different from the previous case. This time, blocks of contiguous rows will be rotated relative to preceding blocks. In particular, blocks of $2^{s-n}$ rows are rotated as single entities. Note that $2^{s-n}$ is exactly the number of rows between consecutive elements required in the stride S access. This rotation pattern serves to place consecutive accesses in adjacent modules. Over a period of N accesses each module is referenced exactly once and conflict-free access is obtained.

An example of a four memory module scheme configured for stride 8 access and using the "rotational" method is shown in FIG. 6. Alternatively, as shown in FIG. 7 and as further described below, the elements in the rows are permuted by an exclusive-OR operation instead of being circularly rotated.

The schemes described for the first and second cases provide for conflict-free accessing for any stride of the form $S=2^s$.

Now the restriction placed on $\sigma$ is removed and the strides of the form $S=\sigma 2^s$, $(\sigma, 2)=1$, are discussed. Assuming the schemes described in the first and second cases have been applied, consider the sequence of module addresses generated by an access of stride $\hat{S}=2^s$. Let this sequence be indicated by $\hat{M}=\hat{a}_0, \hat{a}_1, \ldots$. This sequence is periodic with a period of length N. Each period contains exactly one address equal to i, $0 \leq i < N$. If an access is made from the same initial address but with a stride $S=\sigma \hat{S}=\sigma 2^s$, then the sequence of module addresses for this access, M, is formed by selecting every $\sigma^{th}$ element from $\hat{M}$. That is, the $i^{th}$ element of M is given by $a_i=\hat{a}_{i\sigma}$. Because $\sigma$ is relatively prime to N, any N consecutive elements of M will reference N different memory modules. Therefore, stride S accesses are conflict-free.

Providing hardware support so that a dynamic storage scheme can be implemented efficiently requires a mechanism to transform addresses into physical storage locations. To perform this transformation, the relationship of s to n must be known. Since n, the base 2 logarithm of the number of memory modules, is generally considered fixed and known, it is only necessary to compute s. This computation can be done either by the vectorizing compiler, or by the address mapping circuit 21.

The relation between S and s is illustrated by the truth table in FIG. 8. Since s is the exponent of the largest power of 2 which is a factor of the stride, s can be found by dividing S by 2 until the remainder is non-zero. As is apparent from FIG. 8, s is also the number of trailing zeros in the binary representation of S. A compiler can compute s by loading S into a first register, clearing a second register, rotating the first register right by one binary place, testing the carry, incrementing the second register and continuing shifting when the carry is clear, and otherwise exiting the loop when the carry is set. Upon exiting the loop, the second register holds the value of s.

As shown in FIG. 9, a hardware shift register 40 and a binary counter 41 can be used to compute s from S. The value of S is received on a parallel load input (PL) of the shift register 40 when a START signal is asserted on a parallel load enable input (PE) of the shift register. The START signal also clears the binary counter 41. The least significant bit of S is loaded into the output flip-flop of the shifter register 40 and appears immediately on the serial output ($Q_o$) of the shift register; this output provides a DONE signal.

So long as the DONE signal is not asserted, an inverter 42 enables right shifting of S in the register 40 and counting by the binary counter 41 during each cycle of a common CLOCK. When the DONE signal is asserted, the value of s appears at the output of the binary counter 41.

The value of s can also be computed by a priority encoder 50 as shown in FIG. 10. Such a circuit is preferred if the value of s is to be computed by the address mapping circuit 24 instead of the vectorizing compiler.

As shown in FIG. 10, the priority encoder 50 is a two-level AND-OR logic implementation to perform the Boolean function defined by the truth table in FIG. 8. The encoder 50 includes a first level of inverters 51, a second level of AND gates 52, and a third level of OR gates 53. As is well known, NAND gates could be used in lieu of the AND and OR gates.

To design hardware which implements the proper address transformation, it is useful to consider equations which describe the mappings. The notation $x_{i:j}$ indicates a bit-field of x which begins with bit position i and continues through bit position j. Bit 0 is the least significant position and bit $l-1$ is the most significant. Equation 1 computes the module address in the case where s is less than n:

$$
\begin{aligned}
m(a) &= \left[ a \bmod N + \left[ \frac{a}{N} \right] \bmod 2^s \right] \bmod N \\
&= \left[ a \bmod 2^n + \left[ \frac{a}{2^n} \right] \bmod 2^s \right] \bmod 2^n \\
&= [a_{0:n-1} + a_{n:l-1} \bmod 2^s] \bmod 2^n \\
&= [a_{0:n-1} + a_{n:n+s-1}] \bmod 2^n
\end{aligned}
\tag{1}
$$

Figure 11:
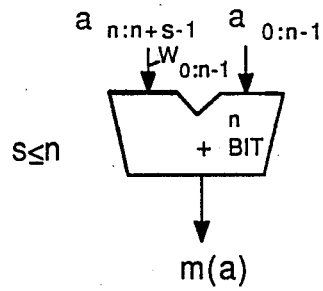
FIG. 11 is a schematic diagram summarizing the determination of the module address for the first case where s is less than or equal to $n = \log_2 N$.

This equation is illustrated in FIG. 11 by an n-bit adder 60 that performs the mod $2^n$ addition.

Equation (2) computes the module address when s is greater or equal to n:

$$
\begin{aligned}
m(a) &= \left[ a \bmod N + \left[ \frac{\left[ \frac{a}{N} \right]}{2^{s-n}} \right] \bmod N \right] \bmod N \\
&= \left[ a_{0:n-1} + \left[ \frac{a_{n:l-1}}{2^{s-n}} \right] \bmod N \right] \bmod 2^n \\
&= [a_{0:n-1} + a_{n+(s-n):l-1} \bmod N] \bmod 2^n \\
&= [a_{0:n-1} + a_{s:s+n-1}] \bmod 2^n
\end{aligned}
\tag{2}
$$

Figure 12:
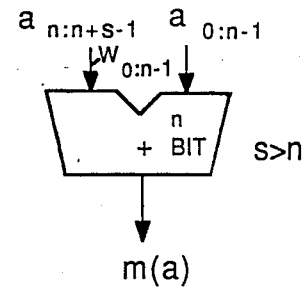
FIG. 12 is a diagram illustrating the determination of the module address for the rotational method and the second case where s is greater than n.

This equation is illustrated in FIG. 12 by an n-bit adder 65 that performs the mod $2^n$ addition.

Figure 13:
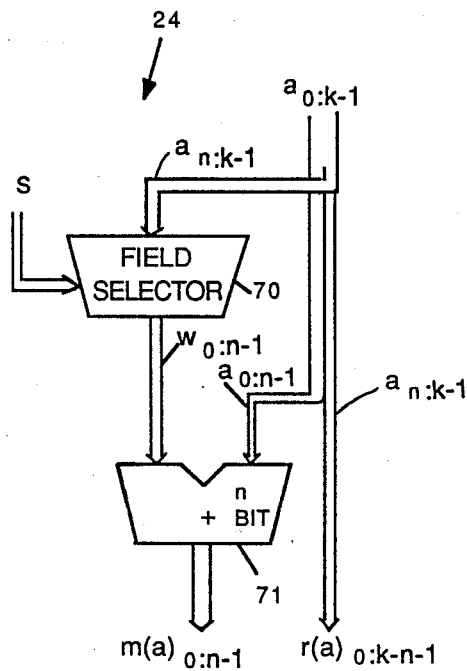
FIG. 13 is a schematic diagram illustrating how a field selector and an n-bit adder are connected to provide the address mapping circuit used in FIG. 1.

As shown in FIG. 13, preferred address mapping circuit 24 uses a single, n-bit adder 70 in connection with a field selection circuit 71 to compute the module address for both cases.

Assuming that the address bus in FIG. 1 conveys a total of k address bits, the field selector 70 receives the address field $n:k-1$ which specifies the row address r(a). In response to the row address and based upon the predetermined value of s, the field selector 70 generates an n-bit value w specifying the amount of rotation for the addressed row. This n-bit value w is fed to the n-bit adder 71 along with the module address field in bits $0:n-1$ of the address a to provide the module address m(a).

Figure 14:
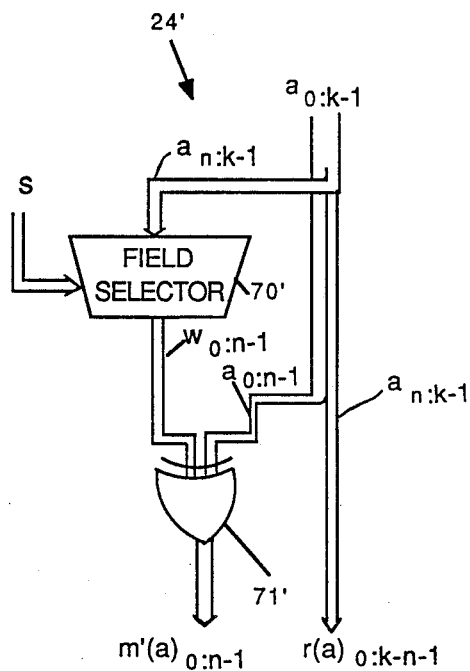
FIG. 14 is an alternative to FIG. 13 in which a set of n 2-input exclusive-OR gates is substituted for the n-bit adder.

An alternative address mapping circuit 24' is shown in FIG. 14. Instead of performing a rotation of the selected row, the circuit 24' performs a permutation upon the row. For this purpose, a set of n two-input exclusive-OR gates 71' is substituted for the n-bit adder 71. This substitution can be made without causing memory conflicts or collisions due to the fact that if an address is mapped into a different module due to a rotation by an amount w, the same address will also fall in a different module due to the exclusive-OR of the module field with the value w. In other words, the set of all possible rotations as well as the set of permutations performed by the exclusive OR gates 71' are both complete orthogonal sets in the sense that for any two different rotations and any two different permutations by the exclusive-OR gates 71', each address is mapped into a different module.

Referring back to FIGS. 5 and 6, it can be seen that the permutations provided by the exclusive-OR gates 71' have the appearance of scrambling the order of the addresses in each row. This makes sequential access of the memory modules somewhat more difficult because, for example, address 15 and address 16 are both mapped to the module $M_2$. Memory conflict in this and other cases is prevented, however, by the address buffers (27 in FIG. 1). On the other hand, the set of exclusive-OR gates 71' has a much shorter propagation delay than the n-bit adder 71, due to the fact that any carries caused during the addition propagate through the adder. The use of the address buffers is not a penalty because it is desirable to use the buffers in any case to reduce memory conflict which occurs when the main memory is accessed with strides other than the predetermined stride S upon which the selected storage scheme is based.

Figures 15, 16:
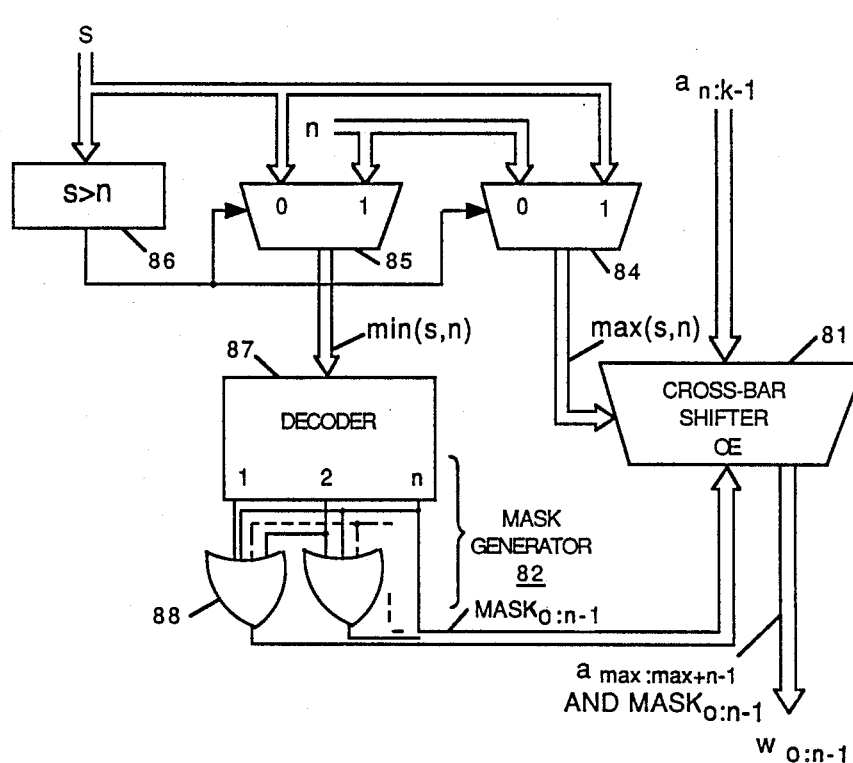
FIG. 15 is a schematic diagram of the preferred circuit for the field selector of FIG. 13 or FIG. 14.
FIG. 16 is a truth table defining the logic performed by a mask generator used in the field selector of FIG. 15.

Turning now to FIG. 15, there is shown a preferred field selector circuit generally designated 70. Basically, it includes a cross-bar shifter 81 controlled by the maximum of s and n, and a mask generator generally designated 82 controlled by the minimum of s and n. The mask generator generates a mask which enables the respective single-bit outputs of the cross-bar shifter to effectively mask the n bits selected by the cross-bar shifter 81.

The cross-bar shifter 81 consists of a set of n $(k-n)$-bit to one bit multiplexers, each one of the multiplexers providing a respective one of the n-bit outputs of the cross-bar shifter 81. The inputs are wired to the n:k−1 field of the address a and to logic zero levels so that the cross-bar shifter selects the max:max+n−1 field of the address.

In order to provide the minimum and maximum of s and n, both s and n are fed to respective multiplexers 84 and 85 which receive a common single-bit control signal responsive to whether s is greater or equal to n. This select signal is provided by a comparator or decoder 86. If n is a power of 2, for example, the comparator or decoder 86 is merely a NOR gate.

The mask generator 82 generates a mask according to the truth table shown in FIG. 16. This function can be provided by a standard decoder 87 having respective outputs indicating whether the minimum of s and n has a value of either 1, 2, ... or n, and n−1 OR gates generally designated 88.

To see that the field selector 70 selects the proper fields for both the first and second cases as shown in FIGS. 11 and 12, respectively, consider first the case of s less than or equal to n. In this case the cross-bar shifter selects the address field n:n+n−1. The desired rotation w should be the field n:n+s−1. In other words, too many most significant bit positions of the address field are selected. The excess bit positions are set to zero by the mask.

For the second case where s is greater than n, then the cross-bar shifter selects the address field s:s+n−1 which is the proper field. Also, in this case, the mask generator 82 receives a value of n and therefore generates a mask having a value of 1 ... 1111. In other words, the mask has no effect in this case.

In view of the above, there has been provided a method of access to parallel memory modules which is conflict free whenever accessed at a predetermined stride S upon which a storage scheme for the respective vector is based. The predetermined stride S is chosen by the programmer or by a vectorizing compiler before the vector data are first loaded into main memory. At any given time, the vector processing system may have vectors stored in the main memory using a different respective storage scheme for each vector.

There has also been disclosed a circuit for mapping address locations to physical memory locations in parallel memory modules to provide the conflict free access by a standard vector processor. In other words, the address mapping circuit of the present invention can be inserted directly between a standard vector processor and its main memory. The method of the present invention, however, can be practiced using alternative address mapping circuits. This is especially true when the range of permissible strides S is limited. In this case, for example, the field selector of FIG. 15 could be replaced by a memory receiving the permissible values of s and the relevant address field $n:s_{max}+n-1$. It also would be possible to practice the present invention using an address generator internal to the processor which generates directly the addressing sequences as a function of S or s.

We claim:

1. A method of dynamic address mapping for conflict-free vector access in a vector processing system having a processor accessing a main memory having a multiplicity of N memory modules in which sequential memory addresses are mapped to different ones of the memory modules, said processor including means for referencing successive addresses differing by a constant access stride, said method comprising the steps of:
   (a) determining a stride S greater than 1 for which a vector is to be accessed;
   (b) accessing said main memory to load data for said vector in said main memory using a storage scheme that is preselected for said vector and is a predetermined function of said stride S and permits conflict-free sequential access and conflict-free access with said stride S;
   (c) accessing said main memory to access data for said vector by using the storage scheme preselected for said vector; and
   (d) repeating steps (a), (b) and (c) for a multiplicity of different vectors, wherein different respective strides S are determined for the vectors, and said main memory is accessed using different respective storage schemes for said vectors, so that the storage scheme is selected dynamically for said multiplicity of vectors.

2. The method as claimed in claim 1, wherein said storage scheme is preselected by factoring said stride S into an odd component and an even component that is a power of 2, and preselecting said storage scheme as a predetermined function of said even component.

3. The method as claimed in claim 2, wherein said memory addresses include a module address field and a row address field, said row address field specifying a respective storage location in each memory module, and said preselected storage scheme is preselected by selecting a portion of said row address field as a predetermined function of said even component, and determining a module address as a predetermined function of said module address field and the selected portion said row address field.

4. The method as claimed in claim 3, wherein said module address is determined as an exclusive-OR function.

5. The method as claimed in claim 3, wherein said module address is determined as a modulo-N addition.

6. The method as claimed in claim 3, wherein said selecting of said portion of said row address field is performed by selecting a predetermined number of address bits and masking said predetermined number of bits with a mask generated as a predetermined function of said even component.

7. The method as claimed in claim 6, wherein said number N of modules is a power of 2 such that $n = \log_2 N$, said selecting of a predetermined number of bits is controlled by the maximum of n and $\log_2$ of said even component, and said mask is generated from the minimum of n and $\log_2$ of said even component.

8. The method as claimed in claim 2, wherein said stride S is factored by loading a binary shift register, shifting said shift register, and counting how many times said shift register is shifted until a serial output of said shift register assumes a predetermined logic state.

9. The method as claimed in claim 1, wherein said memory addresses include a module address field and a row address field, said row address field specifying a respective storage location in each memory module, and said preselected storage scheme is preselected by selecting a portion of said row address field as a predetermined function of said stride S, and determining a module address as a predetermined function of said module address field and said selected portion of said row address field.

10. A method of mapping addresses in a vector processing system of the kind having a processor and a main memory including a plurality of N memory modules; said processor supplying an address having a module address field, and a row address field selecting a respective storage location in each of said memory modules; said processor also supplying a parameter for selecting storage schemes providing predetermined mappings of said address to said storage locations in said modules, said method comprising the steps of:
(a) selecting a portion of said row address field in response to said parameter, and
(b) determining a module address as a predetermined function of said module address field and the preselected portion of said row address field.

11. The method as claimed in claim 10, wherein said module address is determined by modulo-N addition of said module address field and the preselected portion of said row address field.

12. The method as claimed in claim 10, wherein said module address is determined by the exclusive-OR of said module address field and the preselected portion of said row address field.

13. The method as claimed in claim 10, wherein step of selecting said portion of said row address field is performed by selecting a predetermined number of bits of said row address field in response to said parameter, and masking said predetermined number of bits by a mask generated as a predetermined function of said parameter.

14. The method as claimed in claim 13, wherein said predetermined number of bits of said row address field are selected in response to a maximum one of said parameter and a constant related to said number N of modules, and said mask is generated in response to a minimum one of said parameter and said constant.

15. An address mapping circuit for mapping an address from an address bus to physical storage locations in a plurality of N memory modules connected to said address mapping circuit, said address including a row address field specifying a respective address in each of said modules, and a module address field, said address mapping circuit including
(a) selecting means, connected to said address bus, for selecting a portion of said row address field in response to a predetermined parameter, and
(b) determining means, connected to said address bus, said selecting means and said plurality of N memory modules, for determining a module address as a predetermined function of said module address field and said portion of said row address field.

16. The address mapping circuit as claimed in claim 15, wherein said determining means includes adding means, connected to said address bus, said selecting means and said plurality of N memory modules, for performing a modulo-N addition of said module address field and said portion of said row address field to determine said module address.

17. The address mapping circuit as claimed in claim 15, wherein said determining means includes exclusive-OR means, connected to said address bus, said selecting means and said plurality of N memory modules, for performing an exclusive-OR of said module address field and said portion of said row address field.

18. The address mapping circuit as claimed in claim 15, wherein said selecting means for selecting said portion of said row address field includes mask generating means for generating a mask in response to said parameter, and means, connected to said mask generating means, said address bus and said determining means, for selecting and masking a predetermined number of bits of said row address field in response to said parameter and said mask to obtain said portion of said row address field.

19. The address mapping circuit as claimed in claim 18, wherein said means for selecting and masking said predetermined number of bits of said row address field includes bit selecting means, connected to said determining means, for selecting said bits in response to a maximum one of said parameter and a constant related to said number N of modules to obtain said portion of said row address field, and said means for generating said mask includes means, connected to said bit selecting means, for generating said mask in response to a minimum one of said parameter and said constant.

20. The address mapping circuit as claimed in claim 15, further comprising factoring means, connected to said selecting means, for generating said parameter by factoring a specified value into an odd component and a component that is a power of 2, and determining the $\log_2$ of the component that is a power of 2.

* * * * *